(12) United States Patent
Moon et al.

(10) Patent No.: US 8,642,251 B2
(45) Date of Patent: Feb. 4, 2014

(54) DISPLAY APPARATUS AND METHOD OF MANUFACTURING THE SAME

(71) Applicant: Samsung Display Co., Ltd., Yongin (KR)

(72) Inventors: Hyun-cheol Moon, Suwon-si (KR); Jooseok Yeom, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 13/672,182

(22) Filed: Nov. 8, 2012

(65) Prior Publication Data

US 2013/0065475 A1  Mar. 14, 2013

Related U.S. Application Data (62) Division of application No. 12/730,742, filed on Mar. 24, 2010, now Pat. No. 8,310,637.

(30) Foreign Application Priority Data

Sep. 21, 2009  (KR) .................. 10-2009-0089128

(51) Int. Cl.
G02F 1/1335 (2006.01)
G02F 1/13363 (2006.01)

(52) U.S. Cl.
USPC .............................. 430/321; 430/319; 445/24

(58) Field of Classification Search
None
See application file for complete search history.

(56) References Cited

U.S. PATENT DOCUMENTS

2002/0063828 A1* 5/2002 Negoro et al. ............... 349/117
2009/0002588 A1* 1/2009 Lee et al. ...................... 349/42

FOREIGN PATENT DOCUMENTS

| KR | 10-1998-0080087 | 11/1998 |
| KR | 10-1999-0016189 | 3/1999 |
| KR | 10-2005-0122370 | 12/2005 |
| KR | 10-2006-0052389 | 5/2006 |
| KR | 10-2007-0028929 | 3/2007 |

OTHER PUBLICATIONS

Notice of Allowance dated Aug. 3, 2012 for U.S. Appl. No. 12/730,742.

* cited by examiner

*Primary Examiner* — John A. McPherson
(74) *Attorney, Agent, or Firm* — H.C. Park & Associates, PLC (57) ABSTRACT

A method of manufacturing a display apparatus. The liquid crystal display includes a first substrate and a pixel electrode formed on the first substrate and having a plurality of branches. A plurality of alignment sections are interposed among the branches. An auxiliary liquid crystal layer having discotic liquid crystals is formed on the pixel electrode and the alignment sections. A main liquid crystal layer having a vertical alignment mode is formed on the auxiliary liquid crystal layer. A common electrode is formed on the main liquid crystal layer to apply an electric field to the main liquid crystal layer together with the pixel electrode. A second substrate is formed on the common electrode.

11 Claims, 3 Drawing Sheets

DISPLAY APPARATUS AND METHOD OF MANUFACTURING THE SAME

CROSS REFERENCE TO RELATED APPLICATION

This application is a divisional of U.S. patent application Ser. No. 12/730,742, filed on Mar. 24, 2010, and claims priority from and the benefit of Korean Patent Application No. 10-2009-89128, filed on Sep. 21, 2009, which are hereby incorporated by reference for all purposes as if fully set forth herein.

BACKGROUND OF THE INVENTION

1. Field of the Invention

Exemplary embodiments of the present invention relate to a display apparatus and a method of manufacturing the same.

2. Discussion of the Background

A liquid crystal display (LCD) is a display apparatus including a liquid crystal is layer interposed between two transparent substrates. The LCD adjusts light transmittance of each pixel by driving the liquid crystal layer, thereby displaying desired images.

In a vertical alignment mode (VA), liquid crystal molecules are vertically aligned when the electric field is applied between two substrates and the light is transmitted through the liquid crystal molecules, resulting in displaying images. Among VA LCDs, a patterned vertical alignment mode (PVA) LCD forms a plurality of liquid crystal domains to align liquid crystal molecules in various directions using a patterned transparent electrode, thereby improving the viewing angle of the LCD. However, in the case of the PVA LCD, the aperture ratio is lowered due to the patterned transparent electrode.

SUMMARY OF THE INVENTION

Exemplary embodiments of the present invention provide a display apparatus capable of improving display quality thereof.

Exemplary embodiments of the present invention also provide a method of manufacturing such a display apparatus.

Additional features of the invention will be set forth in the description which follows, and in part will be apparent from the description, or may be learned by practice of the invention.

An exemplary embodiment of the present invention discloses a display apparatus that includes a first substrate and a pixel electrode formed on the first substrate and having a plurality of branches. A plurality of alignment sections are interposed among the branches. An auxiliary liquid crystal layer is formed on the pixel electrode and the alignment sections and includes discotic liquid crystals. A main liquid crystal layer having a vertical alignment mode is is formed on the auxiliary liquid crystal layer. A common electrode is formed on the main liquid crystal layer to apply an electric field to the main liquid crystal layer together with the pixel electrode. A second substrate is formed on the common electrode. The discotic liquid crystals aligned at boundaries between each alignment section and two branches adjacent to the alignment section are tilted toward the two branches.

An exemplary embodiment of the present invention also discloses a method of manufacturing the display apparatus. According to the method, a pixel electrode having a plurality of branches is formed on a first substrate. A plurality of alignment sections are interposed among the branches. A discotic compound having discotic liquid crystals is formed on the pixel electrode and the alignment sections. An auxiliary liquid crystal layer is formed by polymerizing the discotic compound. A common electrode is formed on a second substrate and a main liquid crystal layer is formed between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present.

In the following description, when a refractive index in the x-axis direction is $n_x$, a refractive index in the y-axis direction is $n_y$, and a refractive index in the z-axis direction is $n_z$, a negative C-plate and a positive A-plate are defined as follows.

(1) negative C-plate: $n_x = n_y > n_z$ (2) positive A-plate: $n_x > n_y = n_z$

Figure 1:
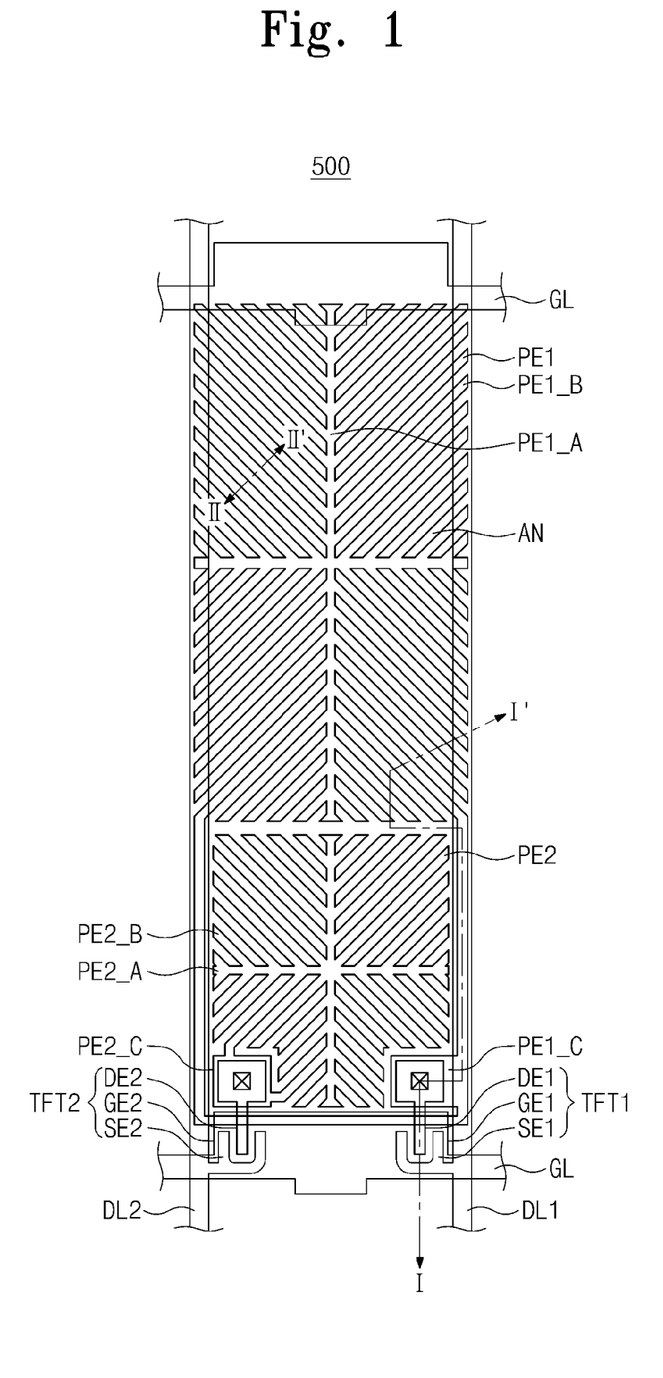
FIG. 1 is a plan view showing a part of a display apparatus according to a first exemplary embodiment of the present invention.
Figure 2:
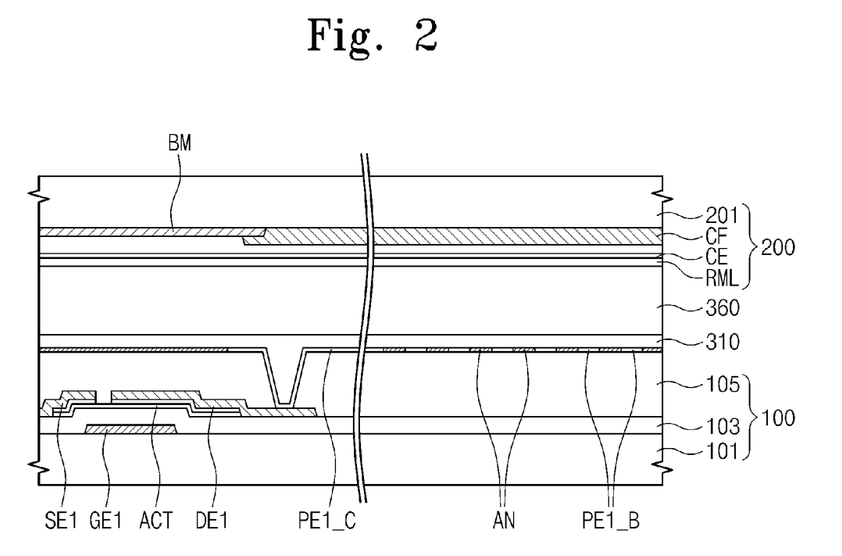
FIG. 2 is a sectional view taken along line I-I' of FIG. 1.

FIG. 1 is a plan view showing a part of a display apparatus according to the first exemplary embodiment of the present invention, and FIG. 2 is a sectional view taken along line I-I' of FIG. 1.

Referring to FIG. 1 and FIG. 2, the display apparatus 500 according to the first exemplary embodiment of the present invention includes a first substrate 100, a second substrate 200 opposite to the first substrate 100, and an auxiliary liquid crystal layer 310 and a main liquid crystal layer 360, which are interposed between the first substrate 100 and the second substrate 200.

The first substrate 100 includes a first insulating substrate 101 having a plurality of pixels. The first insulating substrate 101 is formed thereon with a plurality of gate lines GL and a plurality of data lines DL1 and DL2. There are twice as many data lines DL1 and DL2 as gate lines GL. Each pixel includes one gate line GL and two data lines DL1 and DL2. For the purpose of convenience, the following description will be focused on one exemplary embodiment of a pixel having one gate line GL and two data lines DL1 and DL2, in which the two data lines DL1 and DL2 will be referred to as a first data line DL1 and a second data line DL2. Each pixel may have substantially the same structure.

In each pixel, the gate line GL, a first gate electrode GE1, and a second gate electrode GE2 are disposed on the first insulating substrate 101. The first insulating substrate 101 may include a transparent material, such as glass. The gate line GL extends in a first direction on the first insulating substrate 101. The first gate electrode GE1 and the second gate electrode GE2 may branch from the gate line GL. According to the present exemplary embodiment, the first gate electrode GE1 and the second gate electrode GE2 are formed as a part of the gate line GL without branching from the gate line GL.

An active layer ACT, which is a semiconductor layer, is formed on the gate line GL, the gate insulating layer 103 is interposed therebetween. The first data line DL1, a first source electrode SE1, a first drain electrode DE1, the second data line DL2, a second source electrode SE2, and a second drain electrode DE2 are provided on the first insulating substrate 101 formed with the active layer ACT. The first data line DL1 and the second data line DL2 extend in a second direction substantially perpendicular to the first direction and cross the gate line GL.

The first source electrode SE1 extends from the first data line DL1, and the second source electrode SE2 extends from the second data line DL2. The first drain electrode DE1 is spaced apart from the first source electrode SE1 with the first gate electrode GE1 interposed therebetween. The second drain electrode DE2 is spaced apart from the second source electrode SE2 with the second gate electrode GE2 interposed therebetween.

Pixel electrodes PE1 and PE2 and an alignment section AN are formed on the first source electrode SE1, the second source electrode SE2, the first drain electrode DE1, and the second drain electrode DE2, and a protective layer 105 is interposed therebetween.

The pixel electrodes PE1 and PE2 include transparent conductive material. The pixel electrodes PE1 and PE2 include a first pixel electrode PE1 and a second pixel electrode PE2. The first pixel electrode PE1 is electrically connected to the first drain electrode DE1. The second pixel electrode PE2 is electrically connected to the second drain electrode DE2 while being spaced apart from the first pixel electrode PE1. The first pixel electrode PE1 may have an area larger than that of the second pixel electrode PE2.

A plurality of branches are formed in each of the first pixel electrode PE1 and the second pixel electrode PE2 and slits are formed between adjacent branches. The slits are fine slits having a size of micrometer. According to the present exemplary embodiment, the first pixel electrode PE1 may include a first stem PE1_A having a cross-like shape, first branches PE1_B protruding radially from the first stem PE1_A, and a first contact PE1_C connected to the first stem PE1_A or at least one of the first branches PE1_B while overlapping the first drain electrode DE1. The first contact PE1_C makes contact with the first drain electrode DE1 through a contact hole formed in the protective layer 105.

The second pixel electrode PE2 may include a second stem PE2_A having a cross-like shape, second branches PE2_B protruding radially from the second stem PE2_A, and a second contact PE2_C connected to the second stem PE2_A or at least one of the second branches PE2_B while overlapping the second drain electrode DE2. The second contact PE2_C makes contact with the second drain electrode DE2 through a contact hole formed in the protective layer 105.

The first gate electrode GE1, the first source electrode SE1, and the first drain electrode DE1 constitute a first thin film transistor TFT1, and the second gate electrode GE2, the second source electrode SE2, and the second drain electrode DE2 constitute a second thin film transistor TFT2.

Since the first pixel electrode PE1 and the second pixel electrode PE2 are connected to the first thin film transistor TFT1 and the second thin film transistor TFT2, respectively, voltages applied to the first pixel electrode PE1 and the second pixel electrode PE2 may vary according to the data signals supplied from the first data line DL1 and the second data line DL2. For instance, a first data voltage may be applied to the first pixel electrode PE1 and a is second data voltage higher than the first data voltage may be applied to the second pixel electrode PE2.

The alignment section AN is provided to align the auxiliary liquid crystal layer 310. A plurality of alignment sections AN are provided between the first branches PE1_B and the second branches PE2_B of the first pixel electrode PE1 and the second pixel electrode PE2, respectively. That is, alignment sections AN are arranged adjacent to and alternately with the first branches PE1_B of the first pixel electrode PE1 and alignment sections AN are arranged adjacent to and alternately with the second branches PE2_B of the second pixel electrode PE2.

The auxiliary liquid crystal layer 310 is formed on the alignment section AN. The main liquid crystal layer 360 is formed on the auxiliary liquid crystal layer 310. The main liquid crystal layer 360 has negative optical anisotropy and vertical alignment mode. The auxiliary liquid crystal layer 310 is an optical anisotropic layer that compensates for the phase retardation of light passing through the main liquid crystal layer 360.

The alignment section AN, the auxiliary liquid crystal layer 310 and the main liquid crystal layer 360 will be described later in greater detail with reference to accompanying drawings.

The second substrate 200 is formed on the main liquid crystal layer 360. The second substrate 200 includes a second insulating substrate 201. A light blocking layer BM, a color filter layer CF, a common electrode CE, and a reactive mesogen layer RML are provided on the second insulating substrate 201. The light blocking layer BM prevents light from being unnecessarily emitted. In this regard, the light blocking layer BM includes opaque material capable of absorbing the light. The color filter layer CF allows the light to have colors, such as red, blue or green, after passing through the liquid crystal layer 310 and 360. The common is electrode CE generates the electric field in cooperation with the first pixel electrode PE1 and the second pixel electrode PE2, thereby driving the main liquid crystal layer 360. The reactive mesogen layer RML pre-tilts the liquid crystal molecules of the main liquid crystal layer 360.

Figure 3:
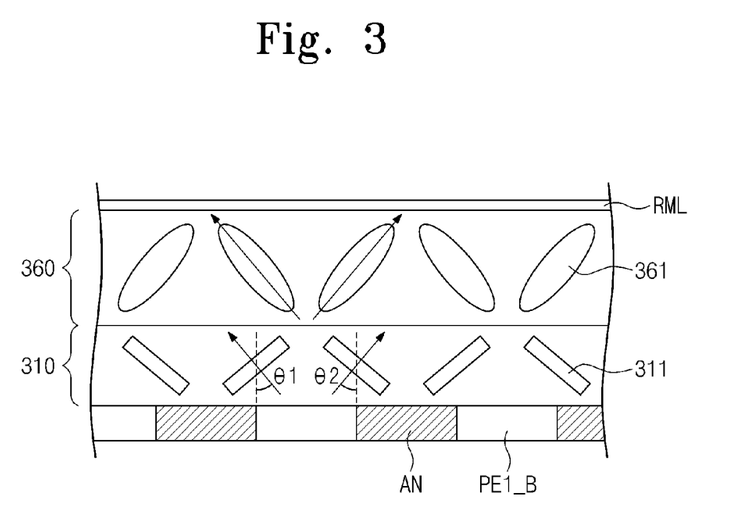
FIG. 3 is a sectional view taken along line II-II' of FIG. 1.

FIG. 3 is a sectional view taken along line II-II' of FIG. 1, which shows the first pixel electrode PE1, the alignment section AN, the auxiliary liquid crystal layer 310, the main liquid crystal layer 360 and the reactive mesogen layer RML of the display apparatus according to the first exemplary embodiment of the present invention.

In the following description and drawings, the expression "liquid crystal molecules are tilted or aligned" does not mean that all liquid crystal molecules are tilted or aligned in one direction. The expression does mean that the liquid crystal molecules are tilted or aligned substantially on the average.

Referring to FIG. 3, the first pixel electrode PE1 of the display apparatus according to the first exemplary embodiment of the present invention includes a plurality of first branches PE1_B spaced apart from each other. The alignment sections AN are provided corresponding to the slits formed between adjacent first branches PE1_B. The alignment sections AN are spaced apart from each other by the first branches PE1_B interposed between adjacent alignment sections AN. Although not required in all aspects, the upper surfaces of the first pixel electrode branches PE1_B may be coplanar with the upper surfaces of the alignment sections AN. The auxiliary liquid crystal layer 310 including discotic liquid crystal molecules 311 and the main liquid crystal layer 360 including main liquid crystal molecules 361 having the vertical alignment mode are formed on the first pixel electrode PE1 and the alignment sections AN.

The alignment sections AN have a function of aligning the discotic liquid crystal is molecules 311 of the auxiliary liquid crystal layer 310. To this end, the alignment sections AN may include an organic compound, such as a polymer. In particular, the alignment sections AN may include a material having an affinity to the discotic liquid crystal molecules 311 of the auxiliary liquid crystal layer 310, such as an organic compound having a hydrophobic group.

Top surfaces of the alignment sections AN are rubbed such that the discotic liquid crystal molecules 311 are aligned or an inorganic compound is deposited on the top surfaces of the alignment sections AN such that the discotic liquid crystal molecules 311 are aligned. A cloth or a paper may be used to rub the top surfaces of the alignment sections AN.

According to one exemplary embodiment, a polymer which can be rubbed is used as a material of the alignment sections AN. The polymer includes polyvinyl alcohol, in particular, modified polyvinyl alcohol having a hydrophobic group. The hydrophobic group has an affinity to a discotic compound. Thus, if the hydrophobic group is imparted to the alignment sections AN, the alignment direction of the discotic compound is controlled due to the affinity between the discotic liquid crystal molecules 311 and the hydrophobic group. The hydrophobic group is attached to an end of a main chain or a side chain of the polymer such as polyvinyl alcohol or modified polyvinyl alcohol. The hydrophobic group may include an alkyl group, an alkenyl group or an aryl group having C6 or above.

When the hydrophobic group is attached to the end of the main chain, a linking group to link the hydrophobic group to the main chain may include one of —S—, —C(CN)$R_1$—, —$NR_2$—, —CS—, or a combination thereof, wherein $R_1$ and $R_2$ are alkyl groups having C1 to C6 or hydrogen, respectively.

The discotic liquid crystal molecules 311 of the auxiliary liquid crystal layer 310 compensate for the phase retardation of light passing through the main liquid crystal layer 360. In the discotic liquid crystal, the refractive index in the x-axis direction is identical to the refractive index in the y-axis direction, and the refractive index in the z-axis direction is smaller than the refractive index in the x-axis direction and y-axis direction. Thus, the auxiliary liquid crystal layer 310 serves as a negative C-plate, thereby compensating for the phase delay in the z-axis direction.

The discotic liquid crystal molecules 311 are polymerized and cured in the auxiliary liquid crystal layer 310. That is, the auxiliary liquid crystal layer 310 is prepared by polymerizing and curing the discotic liquid crystal compound including the discotic liquid crystal molecules 311 and a polymerization initiator. At least two polymerizable functional groups are provided in each discotic liquid crystal molecule 311. When the polymerization initiator initiates the polymerization reaction, the discotic liquid crystal molecules 311 are linked to each other through the polymerizable functional groups. Since the discotic liquid crystal molecules 311 have a greater affinity to the alignment sections AN than to the first branches PE1_B, the discotic liquid crystal molecules 311 are tilted proximate end toward the alignment sections AN and distal ends away from the alignment sections AN. In this state, if the polymerization reaction occurs in the discotic liquid crystal compound, the discotic liquid crystal molecules 311 are cured. As a result, the discotic liquid crystal molecules 311 of the auxiliary liquid crystal layer 310 are cured in a state in which the proximate ends of the discotic liquid crystal molecules 311 are tilted toward the alignment sections AN and the distal ends are tilted away from the alignment sections AN. At this time, the discotic liquid crystal molecules 311 have optical axes extending along a normal line of a discotic plane.

The alignment sections AN and the first branches PE1_B are alternately aligned and two adjacent first branches PE1_B are symmetrical to each other about the alignment section AN interposed between the two adjacent first branches PE1_B. Therefore, the discotic liquid crystal molecules 311, which are aligned at boundaries between the alignment section AN and each of the two adjacent first branches PE1_B, respectively, are tilted distal ends toward the two adjacent first branches PE1_B, respectively. The discotic liquid crystal molecules 311 may be tilted symmetrical to each other about a line perpendicular to the first insulating substrate 101 at the boundaries. In this case, the discotic liquid crystal molecules 311 tilted distal ends toward each of the two adjacent first branches PE1_B may have a first tilt angle $\theta_1$ and a second tilt angle $\theta_2$, respectively, wherein $\theta_2=180°-\theta_1$.

The polymerizable functional groups are linked to the discotic liquid crystal molecules of the discotic liquid crystal compound to generate the polymerization reaction. However, if the polymerizable functional groups are directly linked to the discotic liquid crystal molecules, the alignment may not be maintained during the polymerization reaction. For this reason, the linking groups are interposed between the polymerizable functional groups and the discotic liquid crystal molecules. Thus, when the discotic liquid crystal is D, the divalent linking group is L, and the polymerizable functional group is Q, the discotic compound can be represented by the chemical formula 1.

D(-L-Q)$n$ ($n$ is an integer of 4 to 12)      [Chemical formula 1]

Various discotic liquid crystals are employed if they can serve as the C-plate. For instance, the discotic liquid crystals represented in the chemical formula 2 may be employed. In the chemical formula 2, LQ or QL signifies the link between the divalent linking group L and the polymerizable functional group Q.

[Chemical formula 2]

In the above chemical formula 2, the divalent linking group L may be selected from the group consisting of an alkylene group, arylene group, —CO—, —NH—, —O—, —S—, and a combination thereof. The divalent linking group L may include at least two selected from the group consisting of an alkylene group having C1 to C12, an arylene group having C6 to C10, —CO—, —NH—, —O—, and —S—, or at least two selected from the group consisting of an alkylene group having C1 to C12, an arylene group having C6 to C10, —CO—, and —O—.

The polymerizable function group Q may include one selected from the chemical formula 3.

[Chemical formula 3]

The main liquid crystal layer 360 including the main liquid crystal molecules 361 having the vertical alignment mode are formed on the auxiliary liquid crystal layer 310. The main liquid crystal molecules 361 are aligned according to the first branches PE1_B of the first pixel electrode PE1. The alignment of the main liquid crystal molecules 361 is arranged under the lateral electric field induced around the slits formed in the first pixel electrode PE1. Therefore, the main liquid crystal molecules 361 aligned at the boundaries between the first branch PE1_B and two alignment sections AN adjacent to the first branch PE1_B are tilted distal end toward the alignment sections AN.

Due to the above alignment of the main liquid crystal molecules 361 and the discotic liquid crystal molecules 311, the optical axes of the main liquid crystal molecules 361 are parallel to the optical axes of the discotic liquid crystal molecules 311 (see, arrows in FIG. 3) at one boundary of the two alignment sections AN. Accordingly, the phase of light passing through the main liquid crystal layer 360 is compensated by the discotic liquid crystal molecules 311 of the auxiliary liquid crystal layer 310. Although it has been described that the phase of is light passing through the main liquid crystal layer 360 is compensated by the discotic liquid crystal molecules 311 of the auxiliary liquid crystal layer 310, this is not intended to limit the light path with respect to the main liquid crystal layer 360 and the auxiliary liquid crystal layer 310. According to the present exemplary embodiment of the present invention, the light sequentially passes through the auxiliary liquid crystal layer 310 and the main liquid crystal layer 360.

The reactive mesogen layer RML is provided on the main liquid crystal layer 360. The reactive mesogen has properties similar to those of the liquid crystal molecule and may be obtained by polymerizing a photo reactive monomer. The resulting polymer extends in a predetermined direction to pre-tilt the main liquid crystal molecules 361. The main liquid crystal molecules 361 of the main liquid crystal layer 360 are pre-tilted at a predetermined angle (about 85° to about 95°) by the reactive mesogen layer RML. The main liquid crystal molecules 361, which are pre-tilted at the predetermined angle, have a fast response speed when an electric field is applied thereto as compared with liquid crystal molecules which are not pre-tilted. In this manner, since the reactive mesogen layer RML is used as a director of the main liquid crystal layer 360, an additional director, such as protrusions or slits used to pre-tilt the main liquid crystal molecules 361 of the main liquid crystal layer 360, may not be necessary.

For instance, the reactive mesogen includes compounds expressed in the chemical formula 4.

$$R_3\text{-J-K}\text{—}R_4 \quad \text{[Chemical formula 4]}$$

In the above chemical formula 4, J and K represent or single bond, respectively, excluding that both J and K are single bonds. Hydrogen atoms of the J and K may be replaced with F, Cl, alkyl group having C1 to C12 or —OCH$_3$, respectively, and R$_3$ and R$_4$ are or hydrogen atom, respectively, excluding that both R$_3$ and R$_4$ are single bonds.

The display apparatus according to the first exemplary embodiment of the present invention drives the main liquid crystal molecules 361 of the main liquid crystal layer 360 by applying the electric field to the pixel electrodes PE1 and PE2 and the common electrode CE. As the electric field is applied to the pixel electrodes PE1 and PE2 and the common electrode CE, a substantially vertical electric field is generated between the first substrate 100 and the second substrate 200. In response to the electric field, the main liquid crystal molecules 361 are aligned such that long axes of the main liquid crystal molecules 361 are perpendicular to the direction of the electric field. At this time, the slits formed among the first branches PE1_B, the second branches PE2_B, and the alignment sections AN distort the electric field, thereby creating partially horizontal electric field that determines the tilt direction of the liquid crystal molecules. Although the horizontal electric field is substantially perpendicular to the side of the slit, if the slit is very narrow, the electric field generated by the side of the slit may be offset, so that the liquid crystal molecules are affected by the shape of the slit rather than the electric field caused by the slit. Thus, the liquid crystal molecules of the main liquid crystal layer 360 are aligned parallel to the side of the slit other than perpendicular to the side of the slit. As a result, is the quantity of light passing through the liquid crystal layer is adjusted so that the image is displayed.

According to the display apparatus having the above structure, the phase retardation of the light passing through the display apparatus is effectively compensated.

Figure 4:
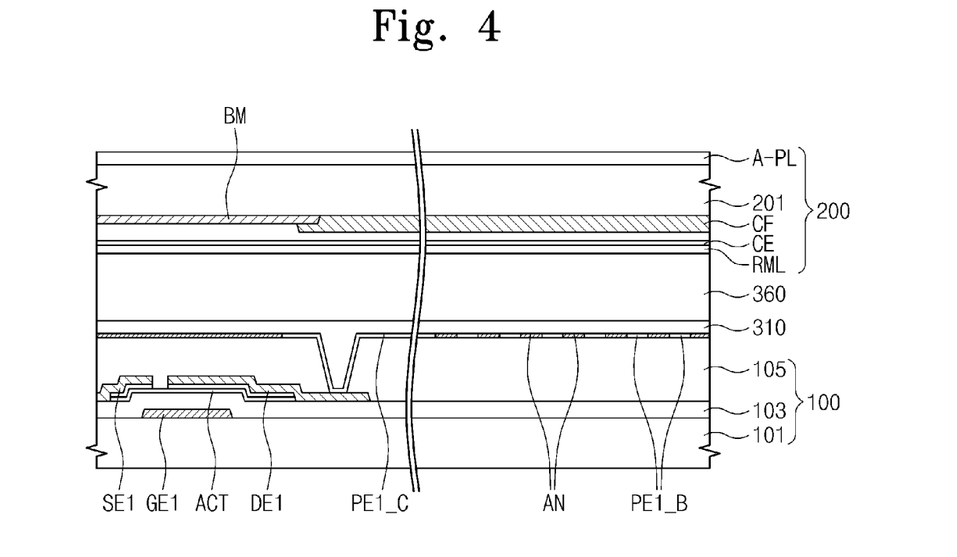
FIG. 4 is a sectional view showing a display apparatus according to a second exemplary embodiment of the present invention.

FIG. 4 is a sectional view showing a display apparatus according to the second exemplary embodiment of the present invention, in which a positive A-plate layer A-PL is added to the first exemplary embodiment. FIG. 4 is taken along line I-I' of FIG. 1. Hereinafter, the second exemplary embodiment of the present invention will be described with reference to the first exemplary embodiment of the present invention while focusing on differences with respect to the first exemplary embodiment of the present invention. For the purpose of convenience, the same reference numerals will be assigned to the same elements.

The display apparatus according to the second exemplary embodiment includes the positive A-plate layer A-PL provided on a second insulating substrate 201. The positive A-plate layer A-PL compensates for the asymmetrical viewing angle.

The positive A-plate layer A-PL may include a bi-axial retardation film which extends in the bi-axial direction and has a phase difference value of substantially zero in the thickness direction. The positive A-plate layer A-PL has a positive in-plane phase difference value. The positive A-plate layer A-PL may include a polymer film or a UV cured film.

When the main liquid crystal molecules 361 are pre-tilted by the reactive mesogen layer RML so that the main liquid crystal molecules 361 are aligned in one direction, the phase retardation value of the light may vary according to the viewing angle. The positive A-plate layer A-PL compensates for the phase retardation value to improve the viewing angle and to reduce the light leakage.

Figure 5:
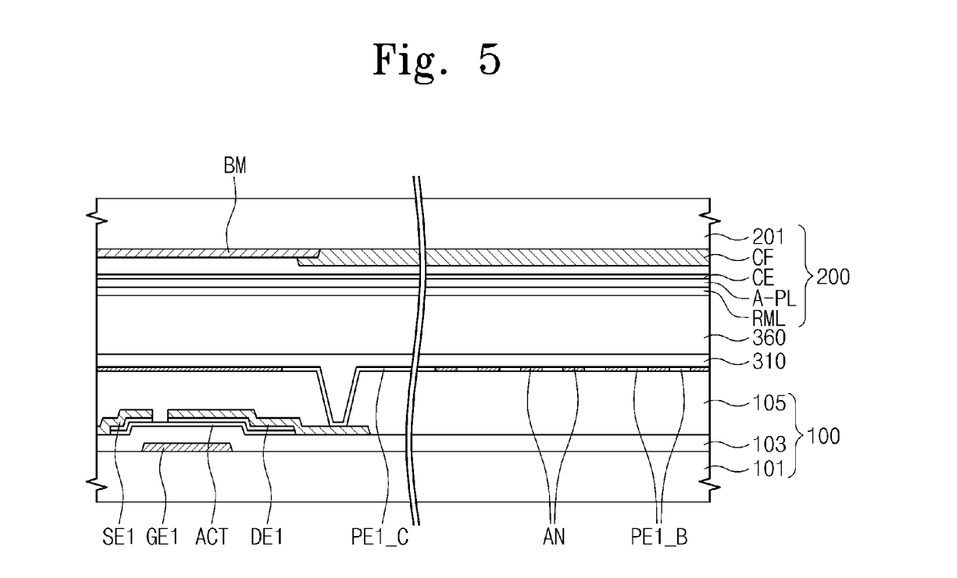
FIG. 5 is a sectional view showing a display apparatus according to a third exemplary embodiment of the present invention.

FIG. 5 is a sectional view showing a display apparatus according to the third exemplary embodiment of the present invention, in which a positive A-plate layer A-PL is added through an in-cell scheme. FIG. 5 is taken along line I-I' of FIG. 1. Hereinafter, the third exemplary embodiment of the present invention will be described with reference to the first exemplary embodiment of the present invention while focusing on differences with respect to the first exemplary embodiment and the second exemplary embodiment of the present invention. For the purpose of convenience, the same reference numerals will be assigned to the same elements.

According to the third exemplary embodiment of the present invention, the positive A-plate layer A-PL is formed between the common electrode CE and the reactive mesogen layer RML through an in-cell scheme. The positive A-plate layer A-PL may be obtained by adding dyes to a curable host liquid crystal having a horizontal alignment mode. The host liquid crystal corresponds to a nematic host liquid crystal and serves as the positive A-plate due to the horizontal alignment mode. The positive A-plate layer A-PL may be coated and cured on the common electrode CE. Since the positive A-plate layer A-PL may be easily manufactured, the manufacturing cost may be reduced.

Hereinafter, an exemplary embodiment of a method of manufacturing the display apparatus of the first exemplary embodiment will be described with reference to the accompanying drawings in FIG. 1, FIG. 2, FIG. 3, FIG. 4 and FIG. 5 while focusing on one exemplary pixel.

The first substrate 100 and the second substrate 200 are prepared and the auxiliary liquid crystal layer 310 and the main liquid crystal layer 360 are formed on the first substrate 100 and the second substrate 200.

In order to prepare the first substrate 100, the pixel electrodes PE1 and PE2 having the branches PE1_B and PE2_B, respectively, are formed on the first insulating substrate 101, the alignment sections AN are interposed among the branches PE1_B and PE2_B, the discotic compound including the discotic liquid crystal molecules 311 are formed on the alignment sections AN and the branches PE1_B and PE2_B, and then the auxiliary liquid crystal layer 310 is formed by polymerizing the discotic compound.

First, the gate line GL, the first data line DL1, the second data line DL2, the first thin film transistor TFT1 and the second thin film transistor TFT2 are formed on the first insulating substrate 101. Then, the first pixel electrode PE1 and the second pixel electrode PE2 connected to the first thin film transistor TFT1 and the second thin film transistor TFT2, respectively, are formed.

The gate lines GL1 and GL2 and gate electrodes GE1 and GE2 of the first thin film transistor TFT1 and the second thin film transistor TFT2 are formed by depositing a conductive layer on the first insulating substrate 101 and then patterning the conductive layer through a photolithography process. The gate electrodes GE1 and GE2 constitute a part of the gate line GL.

Next, the gate insulating layer 103 is formed on the first insulating substrate 101, and the semiconductor layer is formed on the gate insulating layer 103. In this state, a photolithography process is performed to form the active layer ACT by patterning the semiconductor layer.

Then, a conductive layer is deposited on the entire top surface of the first insulating substrate 101 and then the conductive layer is patterned through a photolithography process, thereby forming the first data line DL1, the second data line DL2, and the first source is electrode SE1, the second source electrode SE2, the first drain electrode DE1, and the second drain electrode DE2 of the thin film transistors TFT1 and TFT2.

After that, the protective layer 105 is deposited on the entire surface of the first insulating substrate 101 having the first source electrode SE1, the second source electrode SE2, the first drain electrode DE1, and the second drain electrode DE2, and the protective layer 105 is partially removed through a photolithography process, thereby forming the contact holes that expose a part of the first drain electrode DE1 and a part of the second drain electrode DE2, respectively.

Then, transparent conductive material is deposited on the entire surface of the first insulating substrate 101. Next, the transparent conductive material is selectively patterned by performing a first photolithography process using a mask, thereby forming the first pixel electrode PE1 and the second pixel electrode PE2 having the first branches PE1_B and the second branches PE2_B, respectively. The first pixel electrode PE1 is connected to the first drain electrode DE1 through the contact hole and the second electrode PE2 is connected to the second drain electrode DE2 through the other contact hole. According to the first photolithography process, photoresist is coated on the first insulating substrate 101, on which the transparent conductive material is deposited, and light is irradiated onto the photoresist by using a mask. The photoresist is one of positive photoresist and negative photoresist. Then, a developing process and an etching process are performed to form the pixel electrodes PE1 and PE2.

After that, the alignment sections AN are formed corresponding to the slits between corresponding adjacent branches PE1_B and PE2_B through a second photolithography process. The mask used in the first photolithography process is reused in the second photolithography process. However, the photoresist used in the second photolithography process has a polarity opposite to that of the photoresist used in the first photolithography process. For instance, if the positive photoresist has been used in the first photolithography process, the negative photoresist is used in the second photolithography process or vice versa.

Since the polarity of the photoresist used in the first photolithography process is different from that of the photoresist used in the second photolithography process, reverse patterns are formed by using only one mask. Thus, the alignment sections AN are formed between adjacent branches PE1_B and PE2_B of the pixel electrodes PE1 and PE2, that is, the alignment sections AN are formed in the slits. Although the first and second photolithography processes are performed by using only one mask, the present invention is not limited thereto. According to another exemplary embodiment of the present invention, the first and second photolithography processes can be performed by using different types of masks to form the pixel electrodes PE1 and PE2 and the alignment sections AN. The alignment sections can be rubbed by a cloth or a paper, if necessary.

Then, the discotic compound including the discotic liquid crystal molecules 311 is aligned on the pixel electrodes PE1 and PE2 and the alignment sections AN to form the auxiliary liquid crystal layer 310 on the first substrate 100. The discotic compound may be coated on the pixel electrodes PE1 and PE2 and the alignment sections AN. Since the discotic liquid crystal molecules 311 have a higher affinity to the hydrophobic alignment sections AN, the discotic liquid crystal molecules 311 are tilted proximate end toward the alignment sections AN.

Next, the discotic compound is polymerized by applying heat or light to the discotic compound, thereby forming the auxiliary liquid crystal layer 310. The discotic compound includes the discotic liquid crystal molecules 311 having polymerizable functional groups and the polymerization initiator. As heat or light is applied to the alignment sections AN and the discotic compound, the discotic compound is subject to the polymerization reaction. Due to the polymerization reaction, the discotic liquid crystal molecules 311 are polymerized and fixedly cured.

The polymerization reaction is classified into a thermal reaction caused by the thermal polymerization initiator and a photo reaction caused by the photo polymerization initiator. In one exemplary embodiment of the present invention, the photo polymerization reaction is employed because the photo polymerization reaction rarely exerts an influence upon other elements formed on the first insulating substrate 101. The light used in the photo polymerization reaction may include ultraviolet ray. In order to promote the polymerization reaction, the light may be irradiated while the heat is being applied. The photo polymerization initiator used in the photo polymerization reaction may include one selected from the group consisting of a-carbonyl compound, acyloin ether, a-hydrocarbon substituted acyloin compound, polycyclic quinone compound, combination of triarylimidazole and p-aminophenylketone, acridine or phenazine compound, and oxadiazole compound.

The second substrate 200 can be prepared by forming the common electrode on the second insulating substrate 201.

The reactive mesogen layer RML is formed on the common electrode CE. In order to form the reactive mesogen layer RML, the main liquid crystal layer 360 including the reactive mesogen is formed between the first substrate 100 and the second substrate and the light is irradiated onto the main liquid crystal layer 360 to polymerize the reactive mesogen.

The main liquid crystal layer 360 including the reactive mesogen may be formed by loading the liquid crystal compound constituting the main liquid crystal layer 360 onto one of the first substrate 100 and the second substrate 200, and then aligning the other substrate such that the main liquid crystal layer 360 may be positioned between the first substrate 100 and the second substrate 200. The method of forming the main liquid crystal layer 360 between the first substrate 100 and the second substrate 200 may not be limited to the above, but various methods can be adopted to form the main liquid crystal layer 360 between the first substrate 100 and the second substrate 200.

In order to polymerize the reactive mesogen, the electric field is generated between the first insulating substrate 101 and the second insulating substrate 201 by applying voltage, thereby tilting the main liquid crystal molecules 361 and the reactive mesogen, and then the light is irradiated onto the first substrate 100, the second substrate 200 and the main liquid crystal molecules 361 such that the reactive mesogen is subject to the curing reaction. Since the electric field is generated between first insulating substrate 101 and the second insulating substrate 201 while the light is being irradiated, the main liquid crystal molecules 361 are maintained in a tilted state. When a predetermined time has lapsed from the light irradiation, the reactive mesogen layer RML is formed on the main liquid crystal molecules 361.

If the auxiliary liquid crystal layer 310 and the reactive mesogen layer RML are formed with light irradiation, the auxiliary liquid crystal layer 310 and the reactive mesogen layer RML may be formed through a single process. In other words, the semi-cured discotic compound is coated on the pixel electrodes PE1 and PE2 and the alignment sections AN to form the auxiliary liquid crystal layer 310, and the main liquid crystal layer 360 including the reactive mesogen is formed between the first substrate 100 and the second substrate 200. In this state, the light is irradiated onto the first substrate 100, the second substrate 200, and the main liquid crystal layer 360, thereby curing the auxiliary liquid crystal layer 310 and forming the reactive mesogen layer RML. If the auxiliary liquid crystal layer 310 and the reactive mesogen layer RML are simultaneously formed, the process is simplified and the manufacturing time can be shortened.

Similar to the exemplary embodiment of the method of manufacturing the display apparatus of the first exemplary embodiment of the present invention, the first substrate 100 and the second substrate 200 are prepared and the main liquid crystal layer 360 is formed on the first substrate 100 and the second substrate 200 to manufacture the display apparatus according to the second exemplary embodiment of the present invention. According to the second exemplary embodiment, the positive A-plate layer A-PL is attached to the outer surface of the second insulating substrate 201. That is, when the second substrate 200 is prepared, the positive A-plate layer A-PL is attached to the outer surface of the second insulating substrate 201 which does not make contact with the main liquid crystal layer 360. Otherwise, the positive A-plate layer A-PL is attached to the outer surface of the second insulating substrate 201 after the main liquid crystal layer 360 is formed between the first substrate 100 and the second substrate 200.

Similar to the exemplary embodiment of the method of manufacturing the display apparatus of the first and second exemplary embodiments of the present invention, the first substrate 100 and the second substrate 200 are prepared and the auxiliary liquid crystal layer 310 and the main liquid crystal layer 360 are formed on the first substrate 100 and the second substrate 200 to manufacture the display apparatus according to the third exemplary embodiment of the present invention. According to the third exemplary embodiment of the present invention, the positive A-plate layer A-PL is formed on the common electrode CE when the second substrate 200 is prepared. The positive A-plate layer A-PL may be formed by coating the compound including the nematic host liquid crystal molecules on the second insulating substrate 201 having the common electrode CE and then curing the compound. Since the positive A-plate layer A-PL can be easily formed, the manufacturing cost can be reduced.

According to the display apparatus of the present invention, a phase retardation of light passing through the display apparatus is effectively compensated in the display apparatus. Thus, not only the phase retardation, which is generated when the liquid crystal molecules of the main liquid crystal layer are vertically aligned, is reduced, but also contrast ratio reduction and light leakage, which are caused by the phase retardation, may be reduced. In particular, the light leakage caused by pre-tilted liquid crystal molecules of the main liquid crystal layer is minimized. Therefore, the light leakage is reduced even if the electric field is not applied to the liquid crystal layer of the normally black mode VA LCD. Accordingly, the display quality of the display apparatus is improved.

In addition, according to the method of manufacturing the display apparatus having the above structure, the display apparatus is easily manufactured without using an additional retardation film, so that the manufacturing time and manufacturing cost are reduced.

It will be apparent to those skilled in the art that various modifications and variations can be made in the present invention without departing from the spirit or scope of the invention. For instance, although it has been described that one pixel includes two pixel electrodes, one pixel may include only one pixel electrode or at least three pixel electrodes. Thus, it is intended that the present invention cover the modifications and variations of this invention provided they come within the scope of the appended claims and their equivalents.

What is claimed is:

1. A method of manufacturing a liquid crystal display, the method comprising:
   forming a pixel electrode comprising a plurality of branches on a first substrate;
   forming a plurality of alignment sections between the branches;
   disposing a discotic compound comprising discotic liquid crystals on the pixel electrode and the alignment sections;
   polymerizing the discotic compound to form an auxiliary liquid crystal layer;
   forming a common electrode on a second substrate; and
   disposing a main liquid crystal layer between the first substrate and the second substrate.

2. The method of claim 1, wherein forming the pixel electrode comprises using a mask and one of a positive photoresist and a negative photoresist in a first photolithography process, and
   forming the alignment sections comprises using the mask and a photoresist having a polarity opposite to the photoresist used in the first photolithography process in a second photolithography process.

3. The method of claim 1, wherein the discotic compound comprises discotic liquid crystals comprising a plurality of polymerizable functional groups and a polymerization initiator.

4. The method of claim 3, wherein the polymerizable functional group comprises at least one selected from the group consisting of 5. The method of claim 4, wherein the auxiliary liquid crystal layer is formed through a polymerization by applying heat or light to the alignment sections and the discotic compound.

6. The method of claim 1, further comprising forming a reactive mesogen layer on the common electrode.

7. The method of claim 6, wherein the forming of the reactive mesogen layer comprises:
   disposing the main liquid crystal layer comprising reactive mesogen between the first substrate and the second substrate; and
   polymerizing the reactive mesogen.

8. The method of claim 7, wherein the polymerizing of the reactive mesogen comprises:
   applying a voltage between the pixel electrode and the common electrode; and
   irradiating light onto the reactive mesogen while the voltage being applied.

9. The method of claim 8, further comprising forming a positive A-plate layer between the common electrode and the reactive mesogen layer.

10. The method of claim 9, wherein the forming of the auxiliary liquid crystal layer and the irradiating of the light are simultaneously performed through a single process.

11. The method of claim 1, further comprising forming a positive A-plate film extending in a biaxial direction on the second substrate.

* * * * *